(12) United States Patent
Smith (10) Patent No.: US 11,761,757 B2
(45) Date of Patent: Sep. 19, 2023

(54) SYSTEM AND METHOD FOR DETECTING TOOL PLUGGING OF AN AGRICULTURAL IMPLEMENT BASED ON RESIDUE DIFFERENTIAL

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 399 days.

(21) Appl. No.: 16/665,476

(22) Filed: Oct. 28, 2019

(65) Prior Publication Data
US 2021/0123728 A1    Apr. 29, 2021

(51) Int. Cl.
| G01B 11/30 | (2006.01) |
| A01B 63/24 | (2006.01) |
| A01B 79/00 | (2006.01) |
| G01B 15/08 | (2006.01) |
| G01B 17/08 | (2006.01) |
| A01B 49/02 | (2006.01) |

(52) U.S. Cl.
CPC .............. *G01B 11/30* (2013.01); *A01B 63/24* (2013.01); *A01B 79/005* (2013.01); *G01B 15/08* (2013.01); *G01B 17/08* (2013.01); *A01B 49/027* (2013.01)

(58) Field of Classification Search
CPC ............ G01B 11/30–306; G01B 15/08; G01B 17/08; A01B 63/24; A01B 79/005; A01B 49/027
See application file for complete search history.

(56) References Cited

U.S. PATENT DOCUMENTS

| 8,326,500 | B2 | 12/2012 | Mariman et al. |
| 9,485,900 | B2 | 11/2016 | Connell et al. |
| 9,554,098 | B2 | 1/2017 | Casper et al. |
| 9,875,535 | B2 | 1/2018 | Finch et al. |
| 10,123,475 | B2 | 11/2018 | Posselius et al. |
| 10,165,725 | B2 | 1/2019 | Sugumaran et al. |
| 2014/0041563 | A1* | 2/2014 | Henry et al. ......... A01B 79/005 111/139 |
| 2015/0305224 | A1* | 10/2015 | Casper et al. ......... A01B 33/16 701/50 |
| 2016/0134844 | A1 | 5/2016 | Casper et al. |

(Continued)

FOREIGN PATENT DOCUMENTS

WO    WO201820310    2/2018

OTHER PUBLICATIONS

Extended European Search Report Corresponding to Application No. 20204450.9 dated Mar. 31, 2021 (6 pages).

*Primary Examiner* — Tara Mayo
(74) *Attorney, Agent, or Firm* — Rebecca Henkel; Rickard Demille (57) ABSTRACT

A system for detecting plugging of ground-engaging tools of agricultural implements includes an aft sensor(s) configured to capture data indicative of a post-worked residue coverage of a portion of a field aft of a ground-engaging tool(s). The system includes a controller configured to monitor the data received from the aft sensor(s) and determine the post-worked residue coverage for the portion of the field. The controller is configured to identify when the ground-engaging tool(s) is experiencing a plugged condition based at least in part on the determined post-worked residue coverage for the field.

20 Claims, 5 Drawing Sheets

(56) References Cited

U.S. PATENT DOCUMENTS

| | | |
|---|---|---|
| 2017/0112043 A1 | 4/2017 | Nair et al. |
| 2018/0174291 A1 | 6/2018 | Asada et al. |
| 2018/0210450 A1* | 7/2018 | Ferrari et al. .......... H04N 7/181 |
| 2018/0220577 A1* | 8/2018 | Posselius et al. .... A01B 79/005 |
| 2018/0310469 A1 | 11/2018 | Posselius et al. |
| 2018/0310474 A1 | 11/2018 | Posselius et al. |
| 2018/0336410 A1 | 11/2018 | Posselius |
| 2018/0352718 A1 | 12/2018 | Kovach et al. |
| 2019/0239413 A1 | 8/2019 | Degarmo |
| 2020/0296892 A1* | 9/2020 | Donini et al. ....... A01D 41/127 |
| 2020/0344939 A1 | 11/2020 | Sporrer et al. |
| 2020/0355667 A1 | 11/2020 | Schoeny |

* cited by examiner

_(54)_ SYSTEM AND METHOD FOR DETECTING TOOL PLUGGING OF AN AGRICULTURAL IMPLEMENT BASED ON RESIDUE DIFFERENTIAL

FIELD OF THE INVENTION

The present disclosure generally relates to agricultural implements and, more particularly, to systems and methods for detecting plugging of ground-engaging tools of an agricultural implement based on a differential between the residue coverage forward and aft of the ground-engaging tools.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground-engaging tools configured to penetrate the soil to a particular depth. In this respect, the ground-engaging tools may be pivotally coupled to a frame of the tillage implement. Tillage implements may also include biasing elements, such as springs, configured to exert biasing forces on the ground-engaging tools. This configuration may allow the ground-engaging tools to maintain the particular depth of soil penetration as the agricultural work vehicle pulls the tillage implement through the field. Additionally, this configuration may also permit the ground-engaging tools to pivot out of the way of rocks or other impediments in the soil, thereby preventing damage to the ground-engaging tools or other components on the implement.

However, in certain situations, the ground-engaging tools may become plugged with debris and no longer efficiently engage the ground. For example, dirt clogs or left over crop residue may become trapped between a ground-engaging tool and the ground, thereby reducing a desired penetration depth of the ground tool. As another example, a plug may form in front of a ground-engaging tool relative to a direction of motion of the tillage implement. As such, the ground-engaging tool may plow such plug, thereby rendering tool ineffective at working the soil and subjecting the tool to undesirable loading and potentially premature mechanical failure.

Accordingly, an improved system and method for detecting plugging of ground-engaging tools of an agricultural implement would be welcomed in the technology.

BRIEF DESCRIPTION OF THE INVENTION

Aspects and advantages of the invention will be set forth in pail in the following description, or may be obvious from the description, or may be learned through practice of the invention.

In one aspect, the present subject matter is directed to a system for detecting plugging of ground-engaging tools of agricultural implements. The system includes an agricultural implement including a frame and one or more ground-engaging tools coupled to the frame. The ground-engaging tool(s) is configured to engage soil within a field as the agricultural implement is moved across the field. The system additionally includes one or more aft sensors configured to capture data indicative of a post-worked residue coverage of a portion of the field aft of the ground-engaging tool(s) relative to a direction of travel of the agricultural implement. Further, the system includes a controller configured to monitor the data received from the aft sensor(s) and determine the post-worked residue coverage for the portion of the field. The controller is further configured to identify when the ground-engaging tool(s) is experiencing a plugged condition based at least in part on the determined post-worked residue coverage for the field.

In another aspect, the present subject matter is directed to a method for detecting tool plugging for an agricultural implement. The method includes monitoring, with a computing device, a post-worked residue coverage for a field aft of a ground-engaging tool(s) of the agricultural implement relative to a direction of travel of the agricultural implement. The method also includes identifying that the ground-engaging tool(s) is experiencing a plugged condition based at least in part on the monitored post-worked residue coverage for the field.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In general, the present subject matter is directed to a system and method for detecting plugging of ground-engaging tools of an agricultural implement as the agricultural implement is being toward across a field by a work vehicle to perform an agricultural operation. For instance, one or more residue sensors (e.g., imaging devices, cameras, ultrasonic transceivers, RADAR sensor, LIDAR, sensors, or the like) may be provided in operative association with the implement to capture images of or data associated with a portion of the field aft of ground-engaging tool(s) of the implement as the agricultural operation is being performed. A controller may analyze such images to determine a post-worked residue coverage and thereafter identify whether the ground-engaging tools(s) of the implement are plugged based at least in part on the determined post-worked residue coverage.

In several embodiments, two or more residue sensors may be provided in operative association with the work vehicle and/or the implement to capture images of or data associated with a portion of the field forward and aft of ground-engaging tool(s) of the implement as the agricultural operation is being performed. For example, in one embodiment, the imaging devices may be utilized to capture before and after images of various portions of the field prior to and following such portions of the field being worked by one or more of the ground engaging tools. The images may then be automatically analyzed via the associated controller using computer-vision techniques to estimate the percent crop residue coverage for each imaged portion of the field (i.e., the portion of the imaged area within each image that is covered by crop residue divided by the total imaged area) both prior to working the soil (i.e., a pre-worked percent residue coverage) and after working the soil (i.e., a post worked percent residue coverage). Thereafter, the controller may determine a residue coverage differential between the pre-worked and post-worked residue coverage values and thereafter identify whether one or more ground-engaging tools of the implement are plugged based on the determined residue coverage differential. For example, if it is determined that the residue coverage differential differs from a predetermined threshold set for the ground-engaging tool(s), such as when the residue coverage differential is more than a predetermined threshold, the controller may identify the ground-engaging tool(s) as plugged. The identification of a plugged ground-engaging tool may allow for the operator to take corrective action. Alternatively, the controller may be configured to automatically execute a corrective action adapted to unplug the ground-engaging tool.

Figure 1:
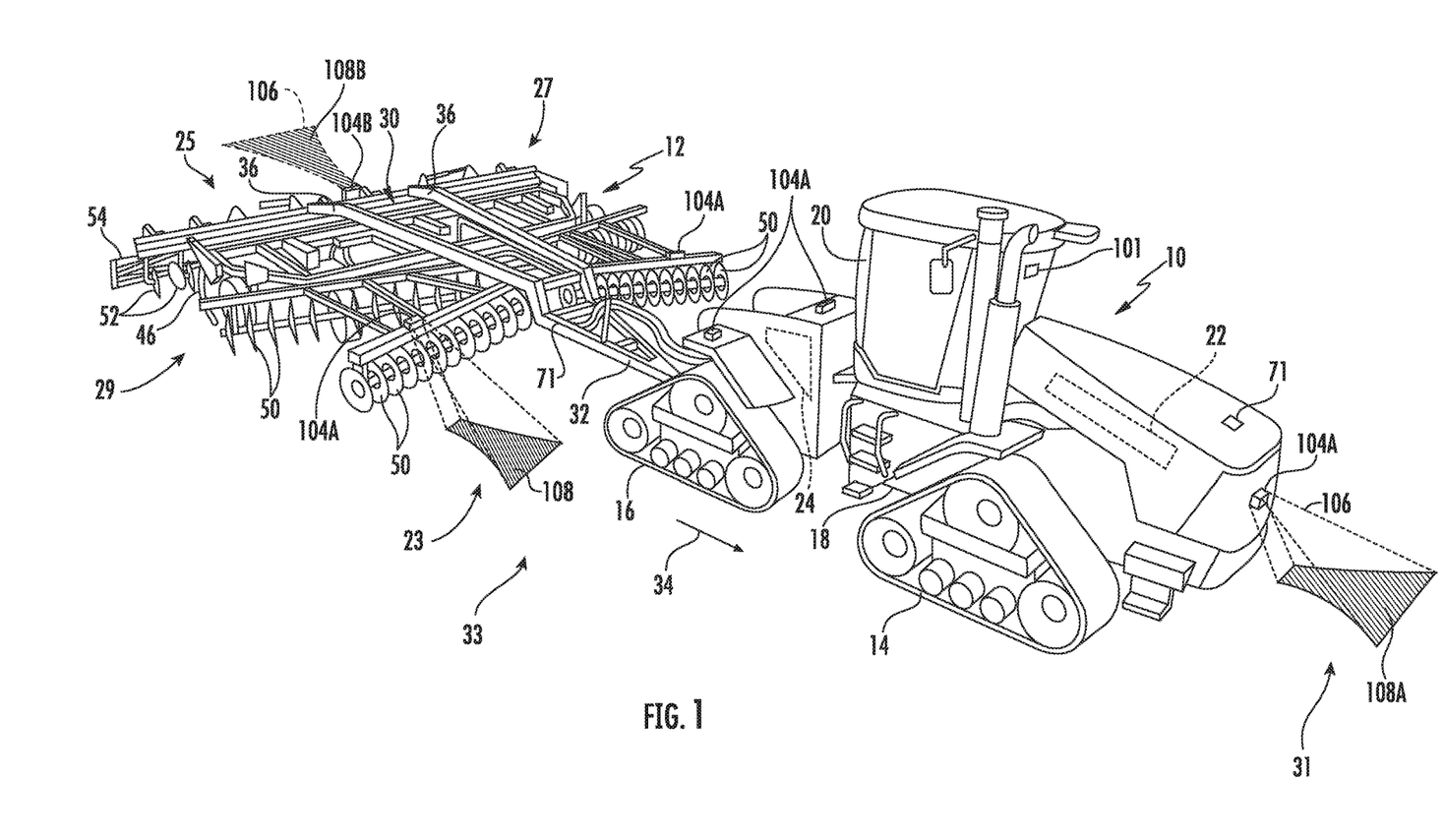
FIG. 1 illustrates a perspective view of one embodiment of a work vehicle towing an agricultural implement in accordance with aspects of the present subject matter.
Figure 2:
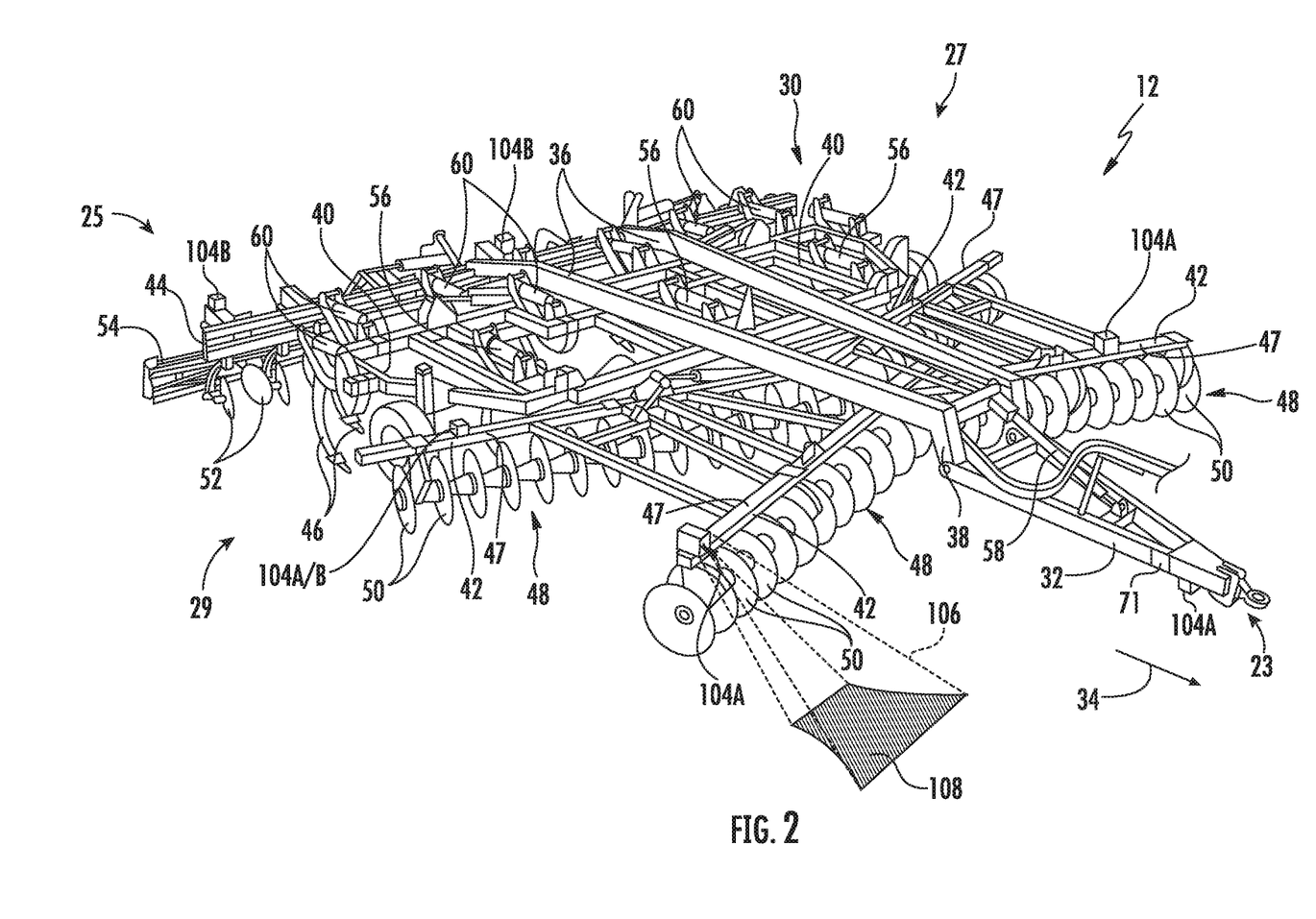
FIG. 2 illustrates an alternative perspective view of the agricultural implement in accordance with aspects of the present subject matter, particularly illustrating various components of the implement.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the agricultural implement 12 (e.g., across a field). Additionally, FIG. 2 illustrates a perspective view of the agricultural implement 12 shown in FIG. 1, particularly illustrating various components of the implement 12.

In general, the implement 12 may be configured to be towed across a field in a direction of travel (e.g., as indicated by arrow 34 in FIG. 1) by the work vehicle 10. As shown, the implement 12 may be configured as a tillage implement, and the work vehicle 10 may be configured as an agricultural tractor. However, in other embodiments, the implement 12 may be configured as any other suitable type of implement, such as a seed-planting implement, a fertilizer-dispensing implement, and/or the like. Similarly, the work vehicle 10 may be configured as any other suitable type of vehicle, such as an agricultural harvester, a self-propelled sprayer, and/or the like.

As particularly shown in FIG. 1, the work vehicle 10 includes a pair of front track assemblies 14, a pair of rear track assemblies 16, and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 and a transmission 24 mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Additionally, as shown in FIGS. 1 and 2, the agricultural implement 12 may generally include a carriage frame assembly 30 configured to be towed by the work vehicle via a pull hitch or tow bar 32 in a travel direction of the vehicle (e.g., as indicated by arrow 34). More specifically, the carriage frame assembly 30 may extend longitudinally between a forward end 23 and an aft end 25. The carriage frame assembly 30 may also extend laterally between a first side 27 and a second side 29. As is generally understood, the carriage frame assembly 30 may be configured to support a plurality of ground-engaging tools, such as a plurality of shanks, disk blades, leveling blades, basket assemblies, and/or the like. For instance, the carriage frame assembly 30 generally includes a plurality of structural frame members, such as beams, bars, and/or the like, configured to support or couple to a plurality of components. In several embodiments, the various ground-engaging tools may be configured to perform a tillage operation across the field along which the agricultural implement 12 is towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the agricultural implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets (disc gang assemblies 48) of disk blades 50. Each disc blade 50 may, in turn, be configured to penetrate into or otherwise engage the soil as the implement 12 is being pulled through the field. As illustrated in FIG. 2, each disc gang assembly 44 includes a toolbar 47 and a plurality of disc blades 50 supported by the toolbar 47 relative to the carriage frame assembly 30. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools. In the embodiment shown in FIGS. 1 and 2, the forward frame 42 includes four disc gang assemblies 48 supported on the carriage frame assembly 30, such as by including two forward disc gang assemblies 48 and two rear disc gang assemblies 48 positioned adjacent to the forward end 23 of the implement 12. However, it should be appreciated that, in alternative embodiments, the implement 12 may include any other suitable number of disc gang assemblies 48, such as more or fewer than four disc gang assemblies 48.

Moreover, similar to the central and forward frames 40, 42, the aft frame 44 may also be configured to support a plurality of ground-engaging tools. For instance, in the illustrated embodiment, the aft frame 44 is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the agricultural implement 12 may also include any number of suitable actuators (e.g., hydraulic cylinders, pneumatic cylinders, electric linear actuators, or the like) for adjusting the relative positioning, penetration depth, and/or down force associated with the various ground-engaging tools 46, 50, 52, 54. For instance, the agricultural implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the agricultural implement 12 may include one or more second actuators 58 coupled to the forward frame 42 to adjust the penetration depth and/or the down pressure of the disk blades 50. Moreover, the agricultural implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and drive axle assembly are coupled, a configuration common in smaller tractors. Still, other configurations may use an articulated chassis to steer the work vehicle 10, or rely on tires/wheels in lieu of the track assemblies 14, 16.

It should also be appreciated that the configuration of the agricultural implement 12 described above and shown in FIGS. 1 and 2 is only provided for exemplary purposes. Thus, it should be appreciated that the present subject matter may be readily adaptable to any manner of agricultural implement configuration. For example, as indicated above, each frame section of the agricultural implement 12 may be configured to support any suitable type of ground-engaging tools, such as by installing closing disks on the aft frame 44 of the agricultural implement 12.

Additionally, in accordance with aspects of the present subject matter, the work vehicle 10 and/or the implement 12 may include one or more, such as two or more, residue sensors 104, such as imaging devices, coupled thereto and/or supported thereon for capturing data (e.g., vision-based data) from the field (e.g., of the soil present within the field and/or a residue coverage of such soil) across which the implement 12 is moved. Specifically, in several embodiments, the residue sensor(s) 104 may be provided in operative association with the implement 12 such that at least one residue sensor 104 has a field of view directed toward a portion(s) of the field located behind one or more ground engaging tools relative to the travel direction 34 of the implement 10. Further, an additional residue sensor(s) 104 may be provided in associated with the work vehicle 10 and/or the implement 12 such that at least one residue sensor 104 has a field of view directed towards the portion(s) of the field located in front of the ground-engaging tool(s) of the implement 12 relative to the travel direction 34 of the implement 10.

For example, as shown in FIG. 1, in one embodiment, one or more forward residue sensors 104A may be provided at a forward end 31 of the work vehicle 10 to allow the forward residue sensor(s) 104A to capture data indicative of a residue coverage of a section of the field disposed in front of the work vehicle 10. Additionally or alternatively, the forward residue sensor(s) 104A may be provided at an aft end 33 of the work vehicle 10 to allow the forward residue sensor(s) 104A to capture data indicative of a residue coverage of a section of the field disposed behind the work vehicle 10. As further illustrated, one or more forward residue sensor(s) 104A may be provided at the forward end 31 of the implement 12 to allow the residue forward sensor(s) 104A to capture data indicative of a residue coverage of a section of the field disposed in front of the implement 12.

Similarly, as shown in FIGS. 1 and 2, one or more aft residue sensors 104B may be provided at or adjacent to the aft end 32 of the implement 12 to allow the aft sensor(s) 104B to capture data indicative of a residue coverage of a section of the field disposed behind the implement 12. It should be appreciated that, in alternative embodiments, the residue sensors 104A, 104B may be installed at any other suitable location(s) on the work vehicle 10 and/or the implement 12, such as at any appropriate location on the carriage frame assembly 30, associated structural frame members (e.g., carrier frame member(s) 36, toolbar(s) 47, and/or any other component attached to the implement 12) such that the sensors 104A, 104B may capture data indicative of the residue coverage of a section of the field adjacent to the sensor 104A, 104B. However, in several embodiments, it should be appreciated that each aft residue sensor 104B may be positioned aft of a corresponding forward residue sensor 104A relative to the direction of travel 34. As such, the aft sensor(s) 104B may capture data indicative of the residue coverage of the same section or approximately the same section of the field as the forward sensor(s) 104A after performance of an agricultural operation, such as a tillage operation.

Moreover, it should be appreciated that the sensors 104 may correspond to any optical sensors and/or suitable sensing devices configured to detect or capture image data or other data (e.g., point cloud data) associated with residue coverage of the soil present within an associated field of view and/or sensor detection range of the sensors 104. Specifically, in several embodiments, the residue sensors 104 may correspond to any suitable device(s) configured to capture images of the field being tilled that allow the field's soil to be distinguished from the crop residue remaining on top of the soil. For example, each residue sensor 104 may correspond to an optical sensor(s) or suitable camera(s) configured to capture images of the field, such as three-dimensional images of the soil surface or the plants present with in the associated field of view. For instance, in a particular embodiment, each residue sensor 104 may correspond to a stereographic cameras) having two or more lenses with a separate image sensor for each lens to allow the camera(s) to capture stereographic or three-dimensional images. In other embodiments, each residue sensor 104 may correspond to any suitable camera(s), such as single-spectrum camera or a multi-spectrum camera configured to capture images in the visible light range and/or infrared spectral range. Alternatively, each residue sensor 104 may correspond to any other suitable image capture device(s) and/or vision system(s) that is capable of capturing "images" that allow the crop residue contained within each image to be distinguished from the soil.

It should be appreciated that, although the residue sensors 104 are generally described herein as corresponding to cameras or other image capture devices, in alternative embodiments, the residue sensors 104 may correspond to Light Detection and Ranging (LIDAR) sensors, RADAR sensors, or any other suitable sensing devices suitable to distinguish the crop residue remaining on top of the soil. For instance, one or more of the residue sensors 104 may be configured as non-vision based sensors, such as one or more ultrasonic transceivers. As such, the following description is equally applicable to such other vision and/or non-vision based sensors.

As shown in FIG. 1, in one embodiment, the residue sensors 104 may be coupled to the work vehicle 10 and/or the implement 12 such that each sensor 104 defines a field of view 106 that allows it to capture images of an adjacent area or portion 108 of the field disposed in front of or behind of at least one of the ground-engaging tools of the implement 12 relative to the direction of travel 34. For instance, the field of view 106 of each residue sensor 104 may be directed along a plane or reference line that extends generally parallel to the travel direction 34 of the work vehicle 10. In such an embodiment, as the work vehicle 10 tows the agricultural implement 12 to allow a tillage operation to be performed along a given section of the field, the residue sensors 104 may capture images in front and behind the ground-engaging tool(s) of the adjacent area or portion 108 of the field both before and after such portion 108 of the field has been tilled (e.g., capture an image(s) of a pre-worked portion 108A of the field and an image(s) of the post-worked portion 108B of the field). As will be described below, by analyzing the images captured by the residue sensors 104, an associated controller 102 (FIG. 4) may be configured to estimate a crop residue parameter associated with the imaged portion(s) of the field (e.g., a percent crop residue coverage). Based on the estimated crop residue parameter, the controller 102 may then detect plugging of one or more of the ground-engaging tools and/or control/adjust the operation of the agricultural implement 12, as necessary, to correct a detected plugged condition of the ground-engaging tool(s)

It should be appreciated that, in alternative embodiments, the residue sensors 104 may be installed at any other suitable location that allows the residue sensors 104 to capture images of an adjacent portion 108 of the field being tilled before and after engagement by one or more of the ground-engaging tools. For instance, as described below with reference to FIG. 3, one or more residue sensors 104 may be coupled to a portion of the agricultural implement 12 and define a field of view 106 oriented directly in front of and/or behind a set of ground-engaging tools, thereby allowing the sensor 104 to capture images of the adjacent area or portion 108 of the associated with a pre-worked residue coverage of the field and/or a post worked residue coverage of the field.

Figure 3:
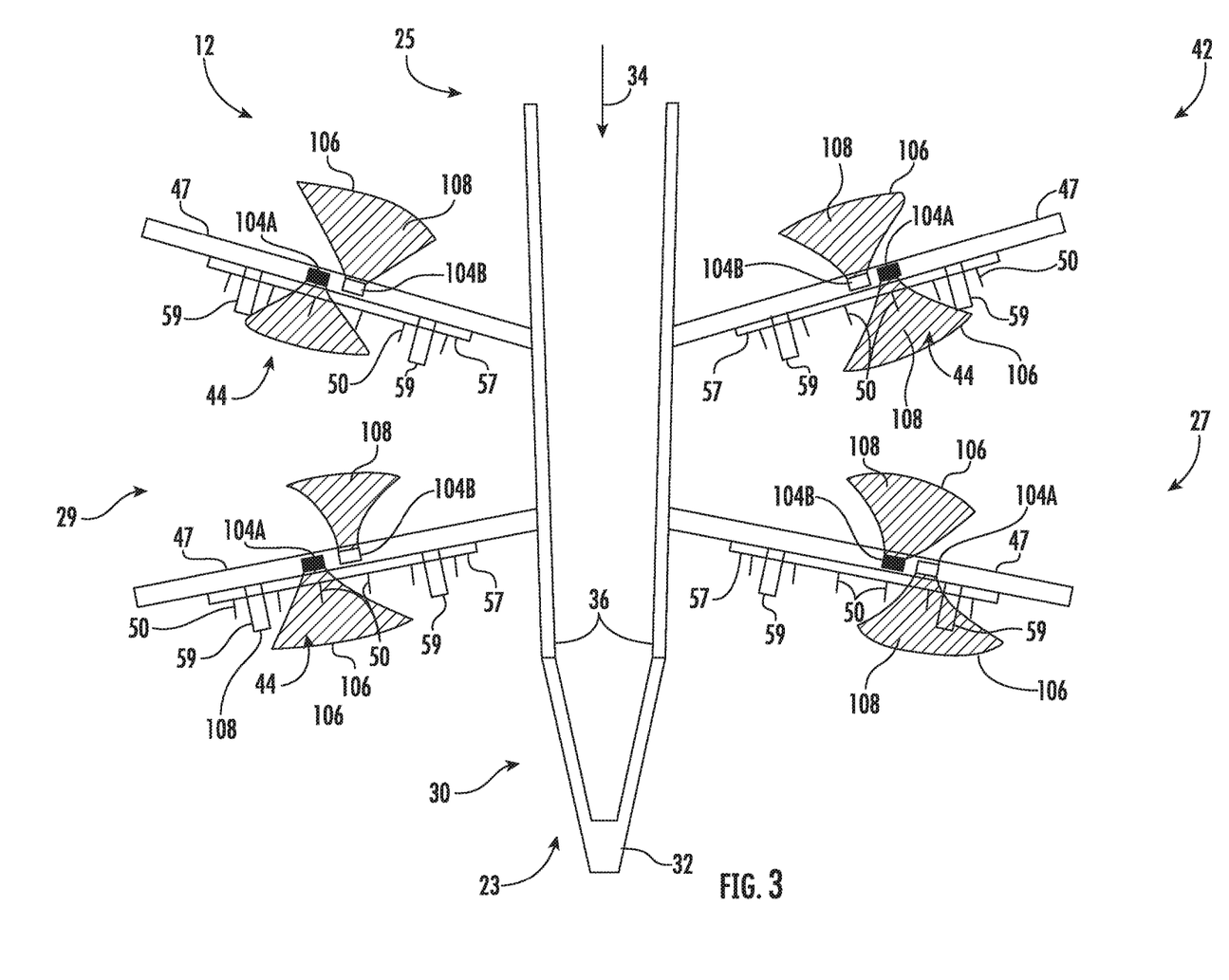
FIG. 3 illustrates schematically a top-view of a forward frame of an agricultural implement in accordance with aspects of the present subject matter, particularly illustrating sensors supported relative to the forward frame for sensing the residue coverage of the field.

Referring now to FIG. 3, an exemplary top-view of the forward frame 42 including disc gang assemblies 44 of the implement 12 described above with reference to FIGS. 1 and 2 is illustrated schematically in accordance with aspects of the present subject matter. Specifically, FIG. 3 illustrates four disc gang assemblies 44 and associated residue sensors 104. However, it should be appreciated that the aspects of disc gang assemblies 44 described herein with reference to FIG. 3 may also be utilized with any ganged tool assembly including any other suitable ground-engaging tools of a given agricultural implement 12 or individual ground-engaging tools coupled directly to any portion of the implement frame. Furthermore, FIG. 3 illustrates ground-engaging supported relative to the forward frame 42, but it should be recognized that the following disclosure is generally applicable to any ground-engaging tool(s) supported relative to any portion of the carriage frame assembly 30, such as the central frame 40 and/or aft frame 42 and associated ground-engaging tools supported relative to such portions of the carriage frame assembly 30. It should be appreciated that the other ground-engaging tools, such as shanks 50 and other portions of the carriage frame assembly 30, such as central and aft frames 40, 42, have been omitted for clarity.

As shown in FIG. 3, each disc gang assembly 44 may include a plurality of the disc blades 50 rotatably coupled to and spaced apart along the length of a disc gang shaft 57. The disc gang shaft 57 may, in turn, be positioned underneath and coupled to the toolbar 47 of the disc gang assembly 44 via one or more hangers 59 of the disc gang assembly 44. For example, the hangers 59 define a C-shape that permits the disc gang shaft 57 and the disc blades 50 mounted thereon to move relative to the toolbar 47. However, it should be appreciated that, in alternative embodiments, the hanger(s) 59 may have any other suitable configuration.

As further illustrated in FIG. 3, the forward frame 42 may support one or more pairs of residue sensors 104A, 104B, with fields of view 106 oriented in front and behind, respectively, the ground-engaging tool(s) to capture data (e.g., vision-based data) indicative of the pre-worked residue coverage for a portion 108 of the field and the post-worked residue coverage of the same or approximately the same portion 108 of the field. For instance, as shown, a pair of residue sensors 104A, 104B may be provided to capture data indicative of the pre-worked and post-worked residue coverage of a portion 108 of the field associated with a row of the ground-engaging tools. Particularly, as shown, the row of ground-engaging tools may correspond to the disc blades 50 (or a portion thereof) of a disc gang assembly 44. Although not shown in FIG. 3, in certain embodiments, more than one pair of residue sensors 104A, 104B may be provided for each disc gang assembly 44 such that the pre-worked and post-worked residue coverage is captured for an entirety of the field swath being worked by the disc blades 50 of each disc gang assembly 50. In another embodiment, one pair of residue sensors 104A, 104B may be provided in association with one or more individual disc blades 50 to capture data indicative of the pre-worked and post-worked residue coverage of a portion 108 of the field associated with the disc blade 50. The residue sensors 104 of FIG. 3 are illustrated as coupled or otherwise supported relative to the toolbar(s) 47. However, in other embodiments, the residue sensors 104 may be coupled to any other suitable structure, such as any component of the disc gang assembly 44, forward frame 42, and/or the carriage frame assembly 30.

It should also be appreciated that, although the embodiments shown in FIGS. 1-3 illustrate multiple residue sensors 104 installed onto the work vehicle 10 and/or the agricultural implement 12, all of the residue sensors 104 need not be included in association with the work vehicle 10 and/or agricultural implement 12. Furthermore, it should be appreciated that additional or alternative residue sensors 104 may be provided at additional or alternative locations of the work vehicle 10 and/or implement 12.

Figure 4:
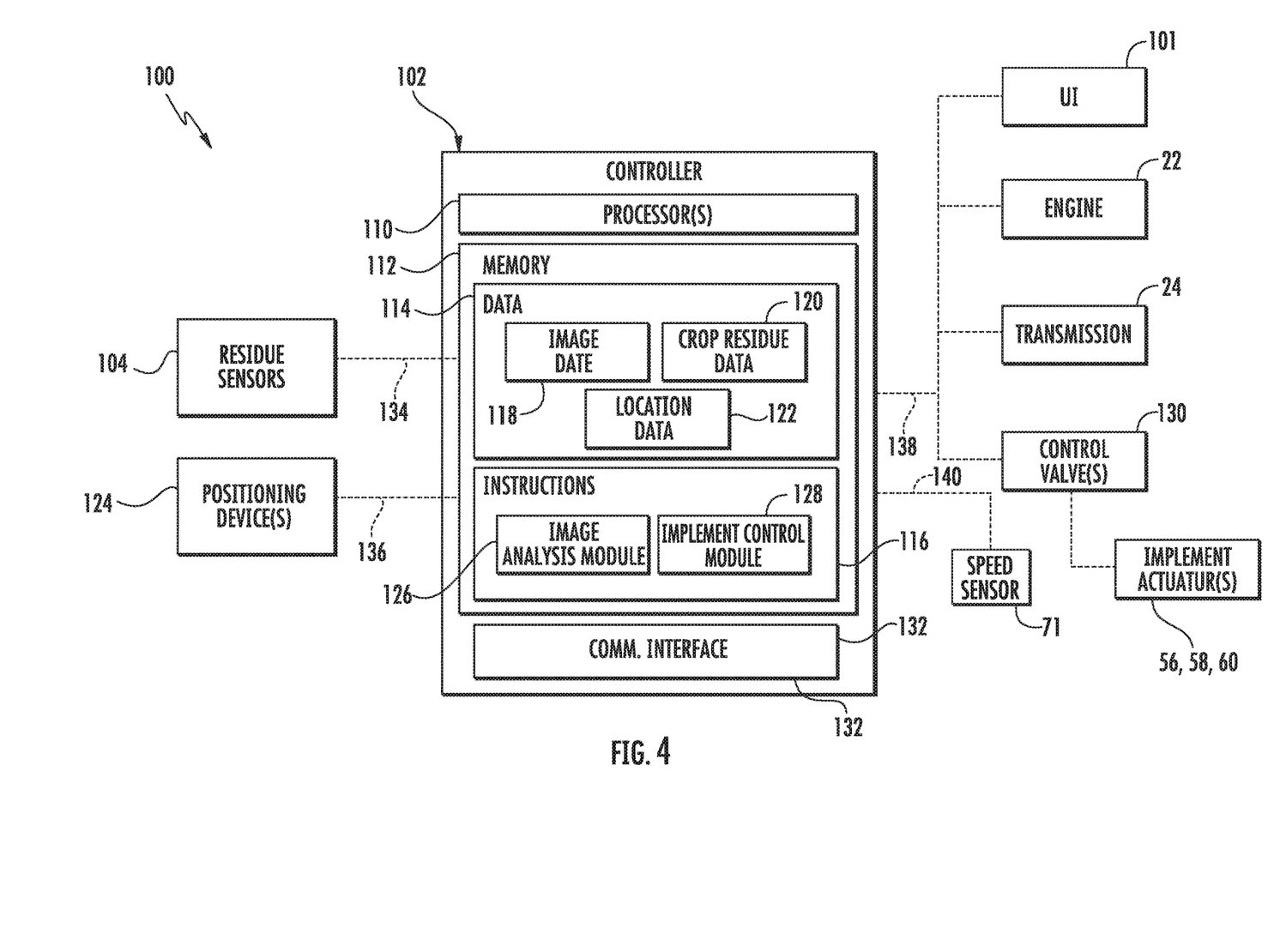
FIG. 4 illustrates a schematic view of one embodiment of a system for detecting plugging of ground-engaging tools of an agricultural implement as an agricultural operation is being performed in accordance with aspects of the present subject matter.

Referring now to FIG. 4, a schematic view of one embodiment of a system 100 for detecting plugging of a ground-engaging tool(s) of an agricultural implement as an agricultural operation, such as a tillage operation, is being performed is illustrated in accordance with aspects of the present subject matter. In general, the system 100 will be described herein with reference to the work vehicle 10 and the agricultural implement 12 described above with reference to FIGS. 1-3. However, it should be appreciated that the disclosed system 100 may generally be utilized with work vehicles having any suitable vehicle configuration and/or agricultural implements have any suitable implement configuration.

In several embodiments, the system 100 may include a controller 102 and various other components configured to be communicatively coupled to and/or controlled by the controller 102, such as a plurality of residue sensors 104 (e.g., imaging devices) and/or various components of the work vehicle 10 and/or the agricultural implement 12. As will be described in greater detail below, the controller 102 may be configured to receive images from the residue sensors that depict one or more portions of the field in both a pre-worked condition and a post worked condition as an agricultural operation is being performed within the field. Based on an analysis of the images received from the residue sensors 104, the controller 102 may be configured to estimate a crop residue parameter associated with the field being tilled forward of one or more ground-engaging tools (e.g., a pre-worked residue coverage) and aft of the ground-engaging tool(s) (e.g., a post-worked residue coverage) as the implement 12 is towed across the field. Thereafter, the controller 102 may be configured to infer or estimate when the ground-engaging tool(s) is experiencing a plugged condition based on a residue coverage differential between the pre-worked and post-worked residue coverage. Upon determining that the ground engaging tool(s) is experiencing a plugged condition, the controller 102 may be configured to notify an operator of such plugged condition or initiate a suitable control action to rectify such plugged condition.

In general, the controller 102 may correspond to any suitable processor-based device(s), such as a computing device or any combination of computing devices. Thus, as shown in FIG. 4, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include an image database 118 for storing images received from the residue sensor(s) 104. For example, the residue sensor(s) 104 may be configured to continuously or periodically capture images of adjacent portions of the field forward and aft of the ground-engaging tool(s) as the agricultural operation is being performed. In such an embodiment, the images transmitted to the controller 102 from the residue sensor(s) 104 may be stored within the image database 118 for subsequent processing and/or analysis.

Additionally, as shown in FIG. 4, the memory 12 may include a crop residue database 120 for storing information related to crop residue parameters for the field being tilled. For example, as will be described below, based on the images received from the residue sensor(s) 104, the controller 102 may be configured to estimate or calculate one or more crop residue parameters for the field, such as a percent crop residue coverage for imaged portions of the field and/or a percent crop residue differential corresponding to the difference in the pre-worked and post-worked percent crop residue coverages for an imaged portion of the field (and/or an average percent crop residue differential). The crop residue parameter(s) estimated or calculated by the controller 102 may then be utilized to determine a plugged condition of the ground-engaging tools and/or stored within the crop residue database 120 for subsequent processing and/or analysis.

Moreover, in several embodiments, the memory 12 may also include a location database 112 storing location information about the work vehicle/implement 10, 12 and/or information about the field being tilled (e.g., a field map). Specifically, as shown in FIG. 4, the controller 102 may be communicatively coupled to a positioning device(s) 124 installed on or within the work vehicle 10 and/or on or within the implement 12. For example, in one embodiment, the positioning device(s) 124 may be configured to determine the exact location of the work vehicle 10 and/or the implement 12 by using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form coordinates) and subsequently stored within the location database 122 for subsequent processing and/or analysis.

Additionally, in several embodiments, the location data stored within the location database 122 may also be correlated to the image data stored within the image database 118. For instance, in one embodiment, the location coordinates derived from the positioning device(s) 124 and the image(s) captured by the residue sensors 104 may both be time-stamped. In such an embodiment, the time-stamped data may allow each image captured by the residue sensors 104 to be matched or correlated to a corresponding set of location coordinates received from the positioning device(s) 124, thereby allowing the precise location of the portion of the field depicted within a given image to be known (or at least capable of calculation) by the controller 102.

Moreover, by matching each image to a corresponding set of location coordinates, the controller 102 may also be configured to generate or update a corresponding field map associated with the field being tilled. For example, in instances in which the controller 102 already includes a field map stored within its memory 112 that includes location coordinates associated with various points across the field, each image captured by the residue sensors 104 may be mapped or correlated to a given location within the field map. Alternatively, based on the location data and the associated image data, the controller 102 may be configured to generate a field map for the field currently being tilled that includes the geo-located images associated therewith.

Referring still to FIG. 4, in several embodiments, the instructions 116 stored within the memory 112 of the controller 102 may be executed by the processor(s) 110 to implement an image analysis module 126. In general, the image analysis module 126 may be configured to analyze the images received by the residue sensors 104 to allow the controller 102 to estimate one or more crop residue parameters associated with the field currently being tilled. For instance, the image analysis module 126 may be configured to implement a suitable computer-vision algorithm or any other suitable image-processing technique that allows the controller 102 to identify or distinguish within each image the soil from any crop residue remaining on top of the soil. By distinguishing the soil from the crop residue contained within each image, the controller 102 may then determine the percent crop residue coverage for the imaged portion of the field. Such value may then be stored within the crop residue database 120 and/or utilized to calculate one or more additional crop residue parameters (e.g., an average percent crop residue coverage for the field, a percent crop residue differential for the imaged portion of the field forward and aft of one or more of the ground-engaging tools, and/or an average percent crop residue differential forward for the field forward and aft of the ground-engaging tool(s)). For instance, as described above with reference to FIGS. 1-3, the forward and aft residue sensors 104A, 104B may be used to capture images of the same area or portion of the field before and after such portion of the field has been tilled. Thus, for a given imaged portion of the field, the controller 102 may be configured to calculate a value for both a pre-worked percent crop residue coverage and a post-worked percent crop residue coverage. The estimated pre-worked and post-worked values may then be compared to calculate a percent crop residue differential for the imaged portion of the field, which may provide the controller 102 with an indication of a plugged condition for one or more of the ground-engaging tools associated with the imaged portion of the field.

It should be appreciated that, in general, the computer-vision algorithm and/or image-processing technique utilized by the controller 102 may rely upon any suitable image characteristics captured by the residue sensors 104 to identify or distinguish the soil from the crop residue contained within each image. For instance, when the residue sensors 104 corresponds to a camera capable of capturing the distinction between the reflective characteristics of the soil and the crop residue, the controller 102 may be configured to implement a computer-vision algorithm that identifies the differences in the reflectivity or spectral absorption between the soil and the crop residue contained within each image being analyzed. Alternatively, the controller 102 may be configured to utilize an edge-finding algorithm to identify or distinguish the soil from the crop residue contained within each image.

However, in additional or alternative embodiments, the controller 102 may utilize data communicated from non-vison based residue sensors 104 and distinguish the soil from the residue based on characteristics of such data. For instance, the controller 102 may utilize a difference between a roughness, height, or other suitable characteristic of the residue and the field based on data communicated from an ultrasonic transceiver, LADAR sensor, RADAR sensor, or the like to distinguish the soil from the crop residue.

Additionally, upon distinguishing the soil from the crop residue, the controller 102 may be configured to utilize any suitable technique or methodology for calculating the percent crop residue coverage for the portion of the field contained or represented within each image or data point received from a residue sensor 104. For instance, in one embodiment, the controller 102 may utilize a "blob analysis" in which the crop residue identified within each image is represented as a "blob" or plurality of "blobs" encompassing a given area within the image. In such an embodiment, the percent crop residue coverage for the imaged portion of the field may be calculated using the following equation (Equation 1):

$$\text{Percent Crop Residue} = (1 - \text{total image area}/(\text{total image area} - \text{blob area}))*100 \quad (1)$$

wherein, the total image area corresponds to the total area defined within the image (e.g., as a function of the total number of pixels of the image) and the blob area corresponds to the total area represented by crop residue within the image (e.g., as a function of the total number of pixels representing the identified crop residue).

Generally, by determining the differential between the crop residue coverage of a portion of the field both pre-worked and post worked, the controller 102 may be able to determine whether the ground-engaging tool(s) used to work such portion of the field is plugged or clogged. Specifically, during operation of the implement 12, the various of the ground-engaging tools, such as the shanks 46 and disc blades 50, may penetrate and cultivate the soil as the agricultural implement 12 is towed across the field. As the ground-engaging tools cultivate the soil, a portion of the residue is generally turned and buried under the soil. Thus, a functioning ground-engaging tool generally reduces the residue coverage of the portion of the field associated with such tool from the pre-worked condition to the post-worked condition For example, the differential between the residue coverage aft and forward of the ground engaging tool may be expected to fall within a range of residue reduction. However, in certain situations, the ground-engaging tools may become plugged or clogged with debris and no longer cultivate the soil or burry a portion of the debris. For example, a plugged ground-engaging tool may plow debris generally in the direction of travel 34 rather than burry a portion of such debris under the cultivated soil. Moreover, a plugged ground-engaging tool may reduce the residue coverage behind the ground-engaging tool to a greater degree than a similarly configured ground-engaging tool that is not plugged, as the residue is plowed forward rather than buried and mixed within cultivated soil. As such, the residue coverage of a post-worked portion of the field associated with a plugged ground-engaging tool may be less than expected for a fully operable ground-engaging tool. For example, the reduction in residue may fall outside the expected range of residue reduction, indicating the ground-engaging tool is experiencing the plugged condition.

By determining the differential between the crop residue coverage of the portion of the field pre-worked and post-worked, the controller 102 may be able to identify whether the ground-engaging tool(s) associated with such portion of the field is plugged or clogged when the differential is greater than expected, such as greater than a predetermined threshold value. It should be appreciated that the pre-worked and post-worked residue differential may be determined for a portion of the field associated with an individual ground-engaging tool to identify when the individual ground-engaging tool is plugged. As another example, the pre-worked and post-worked residue differential may be determined for a portion of the field associated with multiple ground-engaging tools, such as a row of ground-engaging tools (e.g., a disc gang assembly 44, other ganged tool assembly, or individual ground-engaging tools coupled to the same support member of the carrier frame assembly). As such, the controller 102 may be configured to identify when one or more of the ground-engaging tools of the row are plugged.

As a still further example, the pre-worked and post-worked residue differential may be determined for a portion of the field associated with multiple rows of ground-engaging tools, such as rows of ground-engaging tools on the first side 27 or second side 29 of the implement 12. Moreover, in such an instance, the forward residue sensor 104A may be oriented to have a field of view forward of the multiple rows of ground-engaging tools relative to the direction of travel 34, and the rear residue sensor 104B may be oriented to have a field of view aft of the multiple rows of ground-engaging tools relative to the direction of travel 34. As such, the controller 102 may be configured to identify one or more of ground-engaging tools of the rows as plugged based on the pre-worked and post-worked residue coverage differential. In one particular embodiment, the pre-worked and post-worked residue differential may be determined for a portion of the field associated with all of the ground-engaging tools to identify one or more of the ground-engaging tools as plugged. As shown in FIG. 1, for example, the rear residue sensor 104B may be supported relative to the implement 12 (e.g., coupled to the implement 12 at its aft end 25) and oriented to have a field of view aft of the implement 12 relative to the direction of travel 34. Further, the forward residue sensor 104A may be supported relative to the implement 12 or work vehicle 10 and oriented to have a field of view forward of the implement 12 relative to the direction of travel 34.

As another example, the controller 102 may identify the ground-engaging tool(s) as plugged by comparing the differential between the pre-worked and post-worked crop residue coverage of a first portion of the field associated with a first ground-engaging tool(s) to a differential between the pre-worked and post-worked crop residue coverage of a second portion of the field associated with a second ground-engaging tool(s). It should be appreciated that the first ground-engaging tool(s) and second ground-engaging tool(s) may be configured the same or approximately the same. For instance, the first ground-engaging tool(s) may be one or more disc blades 50 of a first disc gang assembly 44 on the first side 27, and the second ground-engaging tool(s) may be one or more of the disc blades 50 of a second disc gang assembly 40 on the second side 29 opposite the first side 27. In several embodiments, when a differential of the pre-worked and post-worked residue coverage for the first portion of the field is greater than a differential of the pre-worked and post-worked residue coverage for the second portion of the field, it may be inferred that the first ground-engaging tool(s) is experiencing a plugged condition and plowing debris rather than burying a portion of the debris. Additionally or alternatively, the controller 102 may be configured to identify the first ground-engaging tool(s) or the second ground-engaging tool(s) as plugged when the differential of the residue coverage pre-worked and post-worked for the first portion of the field differs from the differential of the residue coverage pre-worked and post-worked for the second portion by a predetermined threshold. Though the above determination is based on the comparison of the differential of the residue coverage pre-worked and post-worked associated with two ground-engaging tools or two sets of ground-engaging tools, it is contemplated such comparison may be utilized with any desirable number of or sets of ground-engaging tools.

An exemplary procedure for identifying the ground-engaging tool(s) as experiencing the plugged condition is generally described below. The controller 102 may be configured to analyze each image and/or data point communicated from the residue sensors 104A/104B to estimate a pre-worked percent crop residue coverage and a post-worked percent crop residue coverage for a given portion 108 of the field. The controller 102 may then compare the estimated percentages to calculate a differential between the pre-worked percent crop residue coverage and post-worked percent crop residue coverage for the portion 108 of the field. For instance, if the pre-worked percent crop residue coverage corresponds to 50% and the post-worked percent crop residue coverage corresponds to 35%, the controller 102 may determine that the ground-engaging tool(s) of the agricultural implement 12 has reduced the crop residue percentage by 15%, which may correspond to an operable ground-engaging tool. However, in another instance, if the pre-worked percent crop residue coverage corresponds to 50% and the post-worked percent crop residue coverage corresponds to 20% or less, the controller may identify the ground-engaging tool(s) is plugged. More particularly, a differential between the post-worked crop residue coverage and the pre-worked crop residue coverage greater than a predetermined threshold percentage may trigger then controller 102 to identify that one or more ground-engaging tools associated with such portion 108 of the field are plugged. For instance, the predetermined threshold percentage may be 30%. In one embodiment, the predetermined threshold percentage may generally be selected as a maximum predetermined crop residue percentage differential of the pre-worked and post-worked residue coverage associated with the ground-engaging tool(s) indicating that the ground-engaging tool(s) are not clogged or plugged.

Moreover, the predetermined threshold percentage may be calculated, determined, or retrieved within the memory 112 of the controller 102 based on the particular configuration(s) of the ground-engaging tool(s), the implement 12, and/or the operating conditions of the implement 12 (e.g., the speed of the implement 12, the set penetration depth of the ground-engaging tool(s), or the like). For example, the controller 102 may be communicatively coupled to a speed sensor 71 (see also FIG. 1) associated with the implement 12 and/or work vehicle 10 via a wired or wireless connection to allow operational parameter data to be transmitted from the speed sensor 71 to the controller 102, thereby permitting the controller 102 to monitor the ground speed of the implement 12. This speed data may then be utilized to determine, at least in part, the predetermined threshold percentage. For instance, in one embodiment, separate mathematical expressions or look-up tables may be established for correlating the speed data to the predetermined threshold percentage(s) at differing ground speeds, such as by establishing a mathematical expression or look-up table for each of a plurality of incremental ground speeds (e.g., at each speed defined between 0 MPH and 10 MPH in increments of 0.1 MPH).

As an alternative or additional embodiment, the controller 102 may be configured to infer or estimate when the ground engaging tool(s) is experiencing the plugged condition based on the post-worked residue coverage without receiving images of the pre-worked residue coverage of the portion 108 of field. For instance, the controller 102 may include data stored within the memory 112 indicative of historical residue data for the field. For example, the differential between the pre-worked and post-worked residue coverage for the portion 108 of the field may be determined between the inferred pre-worked residue coverage based on the historical data for the portion 108 of the field and the measured post-worked residue coverage based on the data 134 received from the aft residue sensor(s) 104B. Additionally, or alternatively, the pre-worked residue coverage for the portion 108 of the field may be determined or estimated by the controller 102 based on a previous related operation, such as a harvesting procedure. For instance, the memory 112 may include stored data indicative of the amount of residue exiting a combine during grain harvesting at the portion 108 of the field. As such, the controller 102 may be configured to infer or estimate the pre-worked residue coverage based, at least in part, on the amount of residue introduced into the field at the portion 108 of the field during the previous agricultural operation.

As a still further example, rather than determining the differential between the pre-worked and post-worked residue coverage for a portion of the field, the controller 102 may be configured to determine a differential between post-worked residue coverages for different portions of the field associated with different ground-engaging tool(s) and identify the ground-engaging tool(s) as plugged based on such differential. For instance, the controller 102 may determine a differential between a post-worked residue coverage for a first portion of the field associated with a first ground-engaging tool(s) and a post-worked residue coverage for a second portion of the field associated with a second ground-engaging tool(s). It should be appreciated that the first ground-engaging tool(s) and second ground-engaging tool(s) may be configured the same or approximately the same. For instance, the first ground-engaging tool(s) may be one or more disc blades 50 of a first disc gang assembly 44 on the first side 27, and the second ground-engaging tool(s) may be one or more of the disc blades 50 of a second disc gang assembly 40 on the second side 29 opposite the first side 27. In several embodiments, when the post-worked residue coverage for the first portion of the field is less than post-worked residue coverage for the second portion of the field, it may be inferred that the first ground-engaging tool(s) is experiencing a plugged condition and plowing debris rather than burying a portion of the debris. Moreover, the controller 102 may be configured to identify the first ground-engaging tool(s) or the second ground-engaging tool(s) as plugged when the differential of the residue coverage post-worked for the first portion and second portion of the field is greater than a predetermined threshold. Though the above determination is based on the comparison of the differential of the residue coverage post-worked for two portions of the field associated with two ground-engaging tools or two sets of ground-engaging tools, it is contemplated such comparison may be utilized with any desirable number of or sets of ground-engaging tools.

Furthermore, the controller 102 may be configured to initiate one or more control actions when the controller 102 determines that one or more of the ground-engaging tools are plugged. For example, the controller 102 may be configured to notify the operator of the implement 12 that one or more ground-engaging tools are plugged. Specifically, in one embodiment, the controller 102 may be communicatively coupled to a user interface 101 (see also FIG. 1) via a wired or wireless connection to allow feedback signals to be transmitted from the controller 102 to the user interface 101. In such an embodiment, the feedback signals may instruct the user interface 101 to provide a notification to the operator of the implement 12 (e.g., by causing a visual or audible notification or indicator to be presented to the operator) that provides an indication that one or more of the ground-engaging tools are plugged. In such instances, the operator may then choose to initiate any suitable corrective action he/she believes is necessary, such as adjusting the force applied to the ground-engaging tool(s) and/or adjusting the position of the ground-engaging tool(s). For example, the operator may adjust the one or more of the actuators 56, 58, 60. As such, the ground-engaging tool(s) may rise from an operational position relative to the ground surface as the implement 12 is being moved to a raised position and allow any debris or plug to clear the ground-engaging tool(s). Additionally, raising the ground-engaging tool(s) may reduce a down force applied to the ground-engaging tool(s) and cause any debris or plug of the ground-engaging tool(s) to force the ground-engaging tool(s) upward and allow the ground-engaging tool(s) to clear such obstruction. Additionally, as described below, the controller 102 may be configured to actively control the ground-engaging tool(s) when it is determined that one or more ground-engaging tools are plugged.

In accordance with aspects of the present subject matter, the controller 102 may be configured to control the operation of the ground-engaging tool(s) based on the residue coverage differential between the monitored pre-worked residue coverage and post-worked residue coverage for the portion of the field associated with the ground-engaging tool(s). Moreover, as shown in FIG. 4, the instructions 116 stored within the memory 112 of the controller 102 may also be executed by the processor(s) 110 to execute an implement control module 128. In general, the implement control module 128 may be configured to adjust the operation of the agricultural implement 12 by controlling one or more components of the agricultural implement 12 and/or the work vehicle 10. Specifically, in several embodiments, when the determined or estimated residue coverage differential differs from the predetermined threshold (e.g., is greater than the predetermined residue percentage differential), the implement control module 128 may be configured to fine-tune the operation of the agricultural implement 12 in a manner designed to correct a plugged condition for one or more of the ground-engaging tools.

It should be appreciated that the controller 102 may be configured to implement various different control actions to adjust the operation of the agricultural implement 12 in a manner that corrects the plugged condition of the ground-engaging tool(s). For example, the controller 102 may be configured to adjust an implement parameter associated with the ground-engaging tools of the agricultural implement 12. For instance, as shown in FIG. 4, the controller 102 may be communicatively coupled to one or more valves 130 configured to regulate the supply of fluid (e.g., hydraulic fluid or air) to one or more corresponding actuators 56, 58, 60 of the agricultural implement 12. In such an embodiment, by regulating the supply of fluid to the actuator(s) 56, 58, 60, the controller 104 may automatically adjust the penetration depth, the down force, and/or any other suitable tillage parameter associated with the ground-engaging tools of the agricultural implement 12. In other configuration of the actuator(s) 56, 58, 60 (e.g., one or more electrical linear actuators), the controller 102 may be configured adjust such actuator(s) 56, 58, 60 by supplying power to the actuator(s) 56, 58, 60.

For example, when it is determined that one or more of the ground-engaging tools are plugged, the controller 102 may be configured to transmit control signals to the actuator(s) 56, 58, 60 instructing the actuator(s) 56, 58, 60 to raise the ground-engaging tool(s) from the operational position to the raised position and/or reduce the down force being applied to the ground-engaging tool(s). Additionally, or alternatively, the controller 102 may be configured to transmit control signals to the work vehicle 10 to stop forward motion of the agricultural implement 12. Further, the controller 102 may be configured to transmit control signals to reverse the direction of movement of the agricultural implement 12 to reposition the agricultural implement 12, raise the plugged ground-engaging tool(s) to a raised position, resume forward movement of the agricultural implement 12 past the previous position and the plug, and lower the ground-engaging tool(s) to the operation position to continue the agricultural operation.

Referring still to FIG. 4, the controller 102 may also include a communications interface 132 to provide a means for the controller 102 to communicate with any of the various other system components described herein. For instance, one or more communicative links or interfaces 134 (e.g., one or more data buses) may be provided between the communications interface 132 and residue sensors 104 to allow data indicative of the residue coverage of the portion 108 of the field (e.g., visual data such as images transmitted from one or more imaging devices) to be received by the controller 102. Similarly, one or more communicative links or interfaces 136 (e.g., one or more data buses) may be provided between the communications interface 132 and the positioning device(s) 124 to allow the location information generated by the positioning device(s) 124 to be received by the controller 102. Further, one or more communicative links or interfaces 140 (e.g., one or more data buses) may be provided between the communications interface 132 and the speed sensor 72 to allow the speed information generated by the speed sensor 72 to be received by the controller 102. Moreover, as shown in FIG. 4, one or more communicative links or interfaces 138 (e.g., one or more data buses) may be provided between the communications interface 132 and the engine 22, the transmission 24, the control valves 130, user interface 101, and/or the like to allow the controller 102 to control the operation of such system components or communicate information and/or control signals between the controller 102 and the user interface 101.

Figure 5:
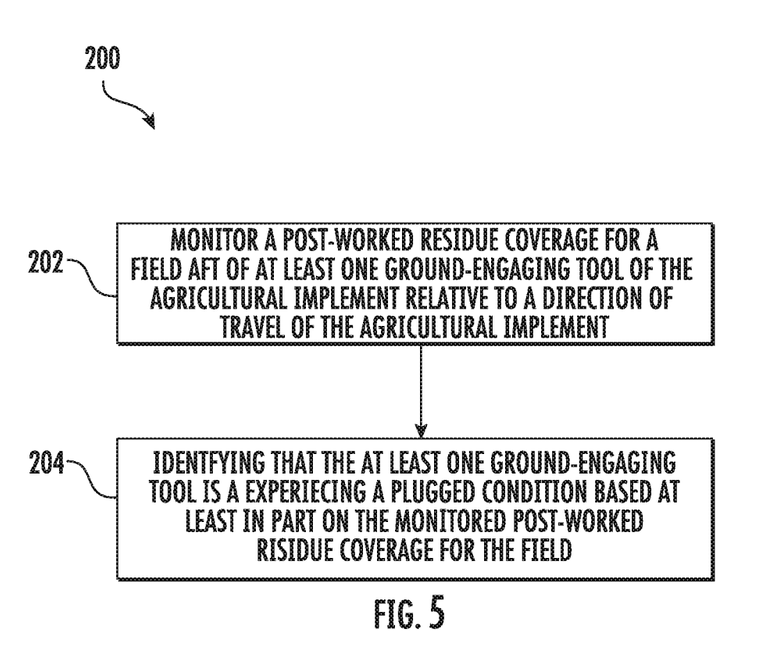
FIG. 5 illustrates a flow diagram of one embodiment of a method for detecting plugging of an agricultural implement as an agricultural operation is being performed in accordance with aspects of the present subject matter.

Referring now to FIG. 5, a flow diagram of one embodiment of a method 200 for detecting plugging of an agricultural implement is illustrated in accordance with aspects of the present subject matter. Particularly, FIG. 5 illustrates a flow diagram of one embodiment of the method 200 for detecting plugging of one or more ground-engaging tool of the agricultural implement. In general, the method 200 will be described herein with reference to the work vehicle 10 and the agricultural implement 12 shown in FIGS. 1-3, as well as the various system components shown in FIG. 4. However, it should be appreciated that the disclosed method 200 may be implemented with work vehicles and/or agricultural implements having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

The method 200 may include controlling the operation of an agricultural implement as the agricultural implement is being towed by a work vehicle across the field to perform the agricultural operation. Specifically, as indicated above, the controller 102 of the disclosed system 100 may be configured to control the operation of the agricultural implement 12, such as by controlling the ground speed at which the implement 12 is being towed and/or by controlling one or more tillage parameters associated with the implement (e.g., the down pressure and/or the penetration depth of one or more ground-engaging tools of the implement 12).

Further, the method 200 may include monitoring a pre-worked residue coverage for a field forward of at least one ground-engaging tool of the agricultural implement relative to a direction of travel of the agricultural implement. For instance, as described above, the controller 102 may be communicatively coupled to one or more sensors, such as the forward residue sensor(s) 104A, which are configured to capture data (such as visual data) indicative of a pre-worked residue coverage forward of a ground-engaging tool(s) prior to an agricultural operation being performed on a given portion 108 of the field. As such, the controller 102 may be configured to monitor the residue coverage or one or more parameters of the residue coverage e.g., the percent crop residue coverage) of the pre-worked portion 108 of the field based on the sensor data received from the forward residue sensor(s) 104A.

At (202), the method 200 may include monitoring a post-worked residue coverage for the field aft of the at least one ground-engaging tool relative to the direction of travel of the agricultural implement. For instance, as described above, the controller 102 may be communicatively coupled to one or more sensors, such as the aft residue sensor(s) 104B, which are configured to capture data (such as visual data) indicative of a post-worked residue coverage aft of the ground-engaging tool(s) subsequent to the agricultural operation being performed on the relevant portion 108 of the field. As such, the controller 102 may be configured to monitor the residue coverage or one or more parameters of the residue coverage (e.g., the percent crop residue coverage) of the post-worked portion 108 of the field based on the sensor data received from the aft residue sensor(s) 104B.

The method 200 may also include analyzing the pre-worked and/or post-worked data to estimate a crop residue parameter for the field. For instance, as indicated above, the controller 102 may, in several embodiments, be configured to implement a computer-vision algorithm or any other suitable image-processing technique or data processing technique that allows the controller 102 to distinguish the crop residue contained within each image or data, point from the underlying soil. In such embodiments, by identifying the amount of crop residue contained within each image or data point, the controller 102 may be configured to estimate or calculate a pre-worked and post-worked percent crop residue coverage for each portion of the field.

Further, the method 200 may include determining a residue coverage differential for the field based at least in part on the monitored pre-worked residue coverage for the field and the monitored post-worked residue coverage for the field. For instance, as explained above, the controller 102 may be configured to compare the estimated or calculated pre-worked and post-worked percent crop residue coverages to determine the residue coverage differential associated with the ground-engaging tool(s).

Additionally, at (204), the method 200 may include identifying that the at least one ground-engaging tool is a experiencing a plugged condition based at least in part on the monitored post-worked residue coverage for the field. For example, the method may include identifying that the at least one ground-engaging tool is a experiencing a plugged condition based at least in part on the determined residue coverage differential for the field. As described above, the controller 102 may be configured to identify that the ground-engaging tool(s) is plugged when the determined residue coverage differential for the portion 108 of the field is greater than a predetermined threshold, such as a predetermined threshold percentage. As an alternative or additional example, the controller 102 may be configured to identify that the ground-engaging tool(s) is plugged by comparing the differential between the pre-worked and post-worked crop residue coverage of a first portion of the field associated with a first ground-engaging tool(s) to a differential between the pre-worked and post-worked crop residue coverage of a second portion of the field associated with a second ground-engaging tool(s). In such an embodiment, the controller 102 may be configured to identify the first ground-engaging tool(s) or the second ground-engaging tool(s) as being plugged when the differential of the pre-worked and post-worked residue coverage for the first portion of the field differs from the differential of the pre-worked and post-worked residue coverage for the second portion by a predetermined threshold.

Moreover, the method 200 may, for example, include initiating a control action based on the identified plugged condition of the ground-engaging tool(s). For example, as described above, when plugging is identified, the controller 102 may be configured to notify an operator of the agricultural implement 12, automatically adjust a position of the ground-engaging tool(s) relative to a ground surface across which the agricultural implement 12 is being moved, and/or adjust a force being applied to the ground-engaging tool(s). Specifically, as described above, the controller 102 may be configured to transmit control signals to the user interface 102 and/or transmit control signals to the actuator(s) 56, 58, 60 to adjust one or more operating parameters of the ground-engaging tool(s), such as the position of the ground-engaging tool(s) and/or the force being applied thereto, based on the detection of plugging. As another example, the controller 102 may be configured to transmit control signals to stop the forward movement of the agricultural implement 12, reverse the direction of movement of the agricultural implement 12 to reposition the agricultural implement 12, raise the plugged ground-engaging tool(s) to a raised position, resume forward movement of the agricultural implement 12 past the plug, and/or lower the ground-engaging tool(s) to an operating position to continue the agricultural operation.

It is to be understood that the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 200, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting plugging of ground-engaging tools of agricultural implements, the system comprising:
    an agricultural implement including a frame, a first ground-engaging tool coupled to the frame, and a second ground-engaging tool coupled to the frame, wherein the first ground-engaging tool and the second ground-engaging tool are each configured to engage soil within a field as the agricultural implement is moved across the field;
    a first forward sensor configured to capture data indicative of a pre-worked residue coverage forward of the first ground-engaging tool; relative to a direction of travel of the agricultural implement:
    a first aft sensor configured to capture data indicative of a post-worked residue coverage of a portion of the field aft of the first ground-engaging tool relative to a direction of travel of the agricultural implement, the first aft sensor positioned forwardly of the second ground-engaging tool; and
    a controller configured to:
        monitor the data received from the first aft sensor and the first forward sensor;
        determine a residue coverage differential between the pre-worked residue coverage and the post-worked residue coverage for the portion of the field; and
        identify when the first ground-engaging tool is experiencing a plugged condition based at least in part on a differential between the pre-worked and post-worked residue coverages varying from an expected range of residue reduction along a path that is parallel to the direction of travel of the implement and non-parallel to an orientation of the first ground-engaging tool.

2. The system of claim 1, wherein the controller is further configured to initiate a control action when the controller identifies that the first ground-engaging tool or the second ground-engaging tool is experiencing the plugged condition, wherein the control action comprises at least one of notifying an operator of the agricultural implement that the first ground-engaging tool or the second ground-engaging tool is plugged, adjusting a position of the first ground-engaging tool or the second ground-engaging tool relative to a ground surface across which the agricultural implement is being moved, or adjusting an actuator force being applied to the first ground-engaging tool or the second ground-engaging tool.

3. The system of claim 1, wherein the first aft sensor or the second aft sensor comprises at least one of a camera, an optical sensor, a RADAR sensor; an ultrasonic transceiver, or a LIDAR sensor.

4. The system of claim 1, wherein the first ground-engaging tool or the second ground-engaging tool comprises at least one shank or disc blade of the agricultural implement.

5. A method for detecting tool plugging for an agricultural implement, the method comprising:
receiving, from a first forward sensor, data indicative of a pre-worked residue coverage forward of a ground-engaging tool;
receiving, from a first aft sensor, data indicative of a post-worked residue coverage aft of the first ground-engaging tool relative to a direction of travel of the agricultural implement;
monitoring, with a computing device, a post-worked residue coverage for a field aft of at least one ground-engaging tool of the agricultural implement relative to a direction of travel of the agricultural implement, wherein the at least one ground-engaging tool is oriented in a non-parallel direction to the direction of travel of the agricultural implement; and
identifying that the at least one ground-engaging tool is experiencing a plugged condition based at least in part on a differential between the pre-worked and post-worked residue coverages for the first ground-engaging tool along a path that is parallel to the direction of travel of the implement and non-parallel to the orientation of the first ground-engaging tool.

6. The method of claim 5, further comprising:
determining, with the computing device, a residue coverage differential for the field based at least in part on the monitored pre-worked residue coverage for the field and the monitored post-worked residue coverage for the field,
wherein identifying that the at least one ground-engaging tool is experiencing a plugged condition comprises identifying that the at least one ground-engaging tool is experiencing a plugged condition based at least in part on the determined residue coverage differential for the field.

7. The method of claim 6, wherein identifying that the at least one ground-engaging tool is a experiencing a plugged condition comprises identifying that the at least one ground-engaging tool is a experiencing the plugged condition when the residue coverage differential differs from a predetermined differential threshold.

8. The method of claim 6, wherein monitoring the pre-worked residue coverage for the field forward of the at least one ground-engaging tool comprises receiving, with the computing device, data from at least one forward sensor configured to capture data indicative of the pre-worked residue coverage of the field forward of the at least one ground-engaging tool relative to the direction of travel of the agricultural implement, and wherein monitoring the post-worked residue coverage for the field aft of the at least one ground-engaging tool comprises receiving, with the computing device, data from at least one aft sensor configured to capture data indicative of the post-worked residue coverage of the field aft of the at least one ground-engaging tool relative to the direction of travel of the agricultural implement.

9. The method of claim 6, wherein monitoring the pre-worked residue coverage for the field forward of at least one ground-engaging tool of the agricultural implement comprises monitoring, with a computing device, a pre-worked residue coverage for the field forward of a first ground-engaging tool of the agricultural implement and a pre-worked residue coverage for the field forward of a second ground-engaging tool of the agricultural implement relative to the direction of travel of the agricultural implement, and wherein monitoring the post-worked residue coverage for the field aft of at least one ground-engaging tool of the agricultural implement comprises monitoring, with a computing device, a post-worked residue coverage for the field aft of the first ground-engaging tool and a post-worked residue coverage for the field aft of the second ground-engaging tool relative to the direction of travel of the agricultural implement.

10. The method of claim 9, wherein identifying that the at least one ground-engaging tool is a experiencing a plugged condition comprises identifying that one of the first ground-engaging tool or the second ground-engaging tool is experiencing the plugged condition based at least in part on a differential between the pre-worked and post-worked residue coverages for the first ground-engaging tool and a differential between the pre-worked and post-worked residue coverages for the second ground-engaging tool.

11. The method of claim 10, wherein identifying that one of the first ground-engaging tool or the second ground-engaging tool is experiencing the plugged condition comprises identifying that one of the first ground-engaging tool or the second ground-engaging tool is experiencing the plugged condition when the differential between the pre-worked and post-worked residue coverages for the first ground-engaging tool differs from the differential between the pre-worked and post-worked residue coverages for the second ground-engaging tool by a predetermined threshold.

12. The method of claim 5, further comprising:
initiating a control action based on the identified plugged condition of the at least one ground-engaging tool.

13. A system for detecting plugging of ground-engaging tools of agricultural implements, the system comprising:
an agricultural implement including a frame, and a first ground-engaging tool configured to engage soil within a field as the agricultural implement is moved across the field, the first ground-engaging tool oriented in a direction that is non-parallel to a direction of travel of the implement;
a first aft sensor configured to capture data indicative of a post-worked residue coverage aft of the first ground-engaging tool relative to a direction of travel of the agricultural implement;

a first forward sensor configured to capture data indicative of a pre-worked residue coverage forward of the first ground-engaging tool relative to a direction of travel of the agricultural implement; and a controller configured to:
- determine the post-worked residue coverage for a portion of the based on the data received from the first aft sensor;
- determine a residue coverage differential between the pre-worked residue coverage and the post-worked residue coverage for the portion of the field based on the data received from the first forward sensor, and
- identify that the first ground-engaging tool is experiencing a plugged condition based at least in part on a differential between the pre-worked and post-worked residue coverages for the first ground-engaging tool along a path that is parallel to the direction of travel of the implement and non-parallel to the orientation of the first ground-engaging tool.

14. The system of claim 1, wherein the controller is configured to determine that the first ground-engaging tool is experiencing the plugged condition when the residue coverage differential differs from a predetermined differential threshold.

15. The system of claim 1, further comprising:
- a second forward sensor configured to capture data indicative of the pre-worked residue coverage forward of the second ground-engaging tool; and
- a second aft sensor configured to capture data indicative of the post-worked residue coverage aft of the second ground-engaging tool.

16. The system of claim 15, wherein the controller is further configured to identify that the second ground-engaging tool is experiencing the plugged condition based at least in part on a differential between the pre-worked and post-worked residue coverages for the second ground-engaging tool.

17. The system of claim 16, wherein the controller is further configured to identify that one of the first ground-engaging tool or the second ground-engaging tool is experiencing the plugged condition when the differential between the pre-worked and post-worked residue coverages for the first ground-engaging tool differs from the differential between the pre-worked and post-worked residue coverages for the second ground-engaging tool by a predetermined differential threshold.

18. The system of claim 1, further comprising:
- a work vehicle configured to move across the field, the agricultural implement coupled to the work vehicle, wherein the first forward sensor is supported on the work vehicle.

19. The system of claim 1, wherein the first forward sensor is supported relative to the frame at or adjacent to a forward end of the agricultural implement relative to the direction of travel and the first aft sensor is supported relative to the frame at or adjacent to an aft end of the agricultural implement relative to the direction of travel.

20. The system of claim 13, wherein the first aft sensor comprises at least one of a camera, an optical sensor, a RADAR sensor, an ultrasonic transceiver, or a LIDAR sensor.

* * * * *